(12) United States Patent
Wang

(10) Patent No.: US 12,067,158 B2
(45) Date of Patent: Aug. 20, 2024

(54) OBJECT INTERACTION METHOD AND SYSTEM, AND COMPUTER-READABLE MEDIUM

(71) Applicant: GUANGDONG OPPO MOBILE TELECOMMUNICATIONS CORP., LTD., Guangdong (CN)

(72) Inventor: Yulu Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 392 days.

(21) Appl. No.: 17/525,772

(22) Filed: Nov. 12, 2021

(65) Prior Publication Data

US 2022/0066569 A1    Mar. 3, 2022

Related U.S. Application Data

(63) Continuation of application No. PCT/CN2020/089641, filed on May 11, 2020.

(30) Foreign Application Priority Data

May 14, 2019 (CN) .......................... 201910399099.X

(51) Int. Cl.
*G06T 7/00* (2017.01)
*G06F 3/01* (2006.01)
(Continued)

(52) U.S. Cl.
CPC .............. *G06F 3/011* (2013.01); *G06F 3/017* (2013.01); *G06F 3/0346* (2013.01); *G06T 7/246* (2017.01);
(Continued)

(58) Field of Classification Search
CPC ........ G06F 3/011; G06F 3/017; G06F 3/0346; G06F 2203/012; G06T 7/246; G06T 7/50;
(Continued)

(56) References Cited

U.S. PATENT DOCUMENTS 9,996,797 B1 * 6/2018 Holz .................... G06F 3/04842
11,151,798 B1 * 10/2021 Casaburo ................ G06T 7/246
(Continued)

FOREIGN PATENT DOCUMENTS

CN     105264460     1/2016
CN     107430437     12/2017
(Continued)

OTHER PUBLICATIONS

CNIPA, First Office Action for CN Application No. 201910399099. X, Jun. 2, 2021.
(Continued)

*Primary Examiner* — Ping Y Hsieh
(74) *Attorney, Agent, or Firm* — Hodgson Russ LLP

(57) ABSTRACT

Disclosed is an object interaction method, comprising: determining a pose of a terminal device under a real environment coordinate system; according to pixel information and depth information of a first object, determining a pose of the first object relative to the terminal device; according to the pose of the terminal device under the real environment coordinate system and the pose of the first object relative to the terminal device, determining a pose of the first object under the real environment coordinate system; determining a pose of a second object under the real environment coordinate system; and according to the pose of the first object under the real environment coordinate system and the pose of the second object under the real environment coordinate system, controlling the first physical object and the second virtual object to interact with each other.

20 Claims, 6 Drawing Sheets

(51) Int. Cl.
  *G06F 3/0346* (2013.01)
  *G06T 7/246* (2017.01)
  *G06T 7/50* (2017.01)
  *G06T 7/70* (2017.01)
  *G06T 7/90* (2017.01)
  *G06V 10/62* (2022.01)
  *G06V 20/20* (2022.01)
  *G06V 20/64* (2022.01)
  *G06V 40/10* (2022.01)

(52) U.S. Cl.
  CPC .............. *G06T 7/50* (2017.01); *G06T 7/70* (2017.01); *G06T 7/90* (2017.01); *G06V 10/62* (2022.01); *G06V 20/20* (2022.01); *G06V 20/647* (2022.01); *G06V 40/11* (2022.01); *G06T 2207/30196* (2013.01)

(58) Field of Classification Search
  CPC ... G06T 7/70; G06T 7/90; G06T 2207/30196; G06V 10/62; G06V 20/20; G06V 20/647; G06V 40/11; G06V 40/28
  See application file for complete search history.

(56) References Cited

U.S. PATENT DOCUMENTS

| | | | |
|---|---|---|---|
| 2016/0239080 A1* | 8/2016 | Marcolina | G06F 1/163 |
| 2017/0097687 A1* | 4/2017 | Pinault | G06F 3/017 |
| 2017/0154470 A1 | 6/2017 | Zhang | |
| 2017/0154471 A1* | 6/2017 | Woo | G06F 3/011 |
| 2018/0284882 A1* | 10/2018 | Shipes | H04S 7/304 |
| 2021/0256261 A1* | 8/2021 | Wang | G02B 27/017 |
| 2021/0375257 A1* | 12/2021 | Tajik | G10L 25/57 |

FOREIGN PATENT DOCUMENTS

| | | |
|---|---|---|
| CN | 108492316 | 9/2018 |
| CN | 108648235 | 10/2018 |
| CN | 108681402 | 10/2018 |
| CN | 105528082 | 11/2018 |
| CN | 109474816 | 3/2019 |
| CN | 109683700 | 4/2019 |
| CN | 109712172 | 5/2019 |
| CN | 109725733 | 5/2019 |

OTHER PUBLICATIONS

EPO, Office Action for EP Application No. 20806291.9, Jul. 4, 2023.
CNIPA, Decision of Rejection for CN Application No. 201910399099.X, Feb. 18, 2022.
CNIPA, Second Office Action for CN Application No. 201910399099.X, Oct. 26, 2021.
EPO, Extended European Search Report for EP Application No. 20806291.9, May 10, 2022.

* cited by examiner

OBJECT INTERACTION METHOD AND SYSTEM, AND COMPUTER-READABLE MEDIUM

CROSS REFERENCE TO RELATED APPLICATIONS

This application is a continuation of International Patent Application No. PCT/CN2020/089641, filed on May 11, 2020, which claims priority to Chinese Patent Application No. 201910399099.X, filed on May 14, 2019, the entire disclosures of which are incorporated herein by reference.

TECHNICAL FIELD

The disclosure relates to the field of augmented reality technology, and more particularly, to an object interaction method, an object interaction system, and a computer-readable medium.

BACKGROUND

Augmented Reality (AR) is a technology through which virtual elements are integrated into the real world and can interact with real objects. With the improvement of processing capability of terminal devices, augmented reality technology can be widely used in various fields such as games, education, medical care, transportation, and information tracking.

At present, in the process of realizing the interaction between real objects and virtual objects by augmented reality technology, the interaction completely depends on the user's touch operation on the terminal screen. For example, the user can realize effects such as the translation, rotation, placement and deletion of virtual objects by touching controls configured to control the virtual objects.

On the one hand, the touch operation on the terminal screen does not conform to people's interaction habits in daily activities, resulting in inconvenience for users. On the other hand, in some related technologies, the interaction between virtual objects and real objects is realized only based on the positional relationship between objects, which may lead to scenes that do not conform to the common sense of interaction, resulting in poor user interaction experience.

It should be noted that the information disclosed in the above background section is only used to enhance the understanding of the background of the disclosure, and therefore may include information that does not constitute the prior art known to those of ordinary skill in the art.

SUMMARY

The objective of the disclosure is to provide an object interaction method, an object interaction system, and a computer-readable medium, thereby overcoming, at least to a certain extent, the problem of poor virtual-real interaction effects of augmented reality technology due to the limitations and defects of related technologies.

In an aspect of the disclosure, an object interaction method is provided. The method, applied to a terminal device, includes: determining a pose of the terminal device in a real environment coordinate system; determining, according to pixel information and depth information of a first object, a pose of the first object relative to the terminal device, the first object being a physical object in a real environment; determining a pose of the first object in the real environment coordinate system, according to the pose of the terminal device in the real environment coordinate system and the pose of the first object relative to the terminal device; determining a pose of a second object in the real environment coordinate system, the second object being a virtual object configured in the real environment; and controlling the first object and the second object to interact with each other, according to the pose of the first object in the real environment coordinate system and the pose of the second object in the real environment coordinate system.

In a further aspect of the disclosure, an object interaction system is provided. The system includes a camera, an inertial sensor, a depth sensor, one or more processors, and a memory. The camera is configured to acquire image information in a reality scene; the inertial sensor is configured to acquire inertial information of a terminal device; the depth sensor is configured to determine depth information of an object in the reality scene; and the memory is configured to store one or more programs which, when executed by the one or more processors, cause the one or more processors to implement the above object interaction method.

In further another aspect of the disclosure, a computer-readable medium is provided. A computer program is stored on the computer-readable medium, and the computer program, when executed by a processor, is configured to implement the above object interaction method.

BRIEF DESCRIPTION OF THE DRAWINGS

The drawings herein are incorporated into the specification and constitute a part of the specification. The drawings show embodiments in accordance with the disclosure, and together with the specification are used to explain the principle of the disclosure. Obviously, the drawings in the following description are only some embodiments of the disclosure. For those of ordinary skill in the art, other drawings can be obtained based on these drawings without paying creative work.

DETAILED DESCRIPTION OF PREFERRED EMBODIMENTS

Figure 1:
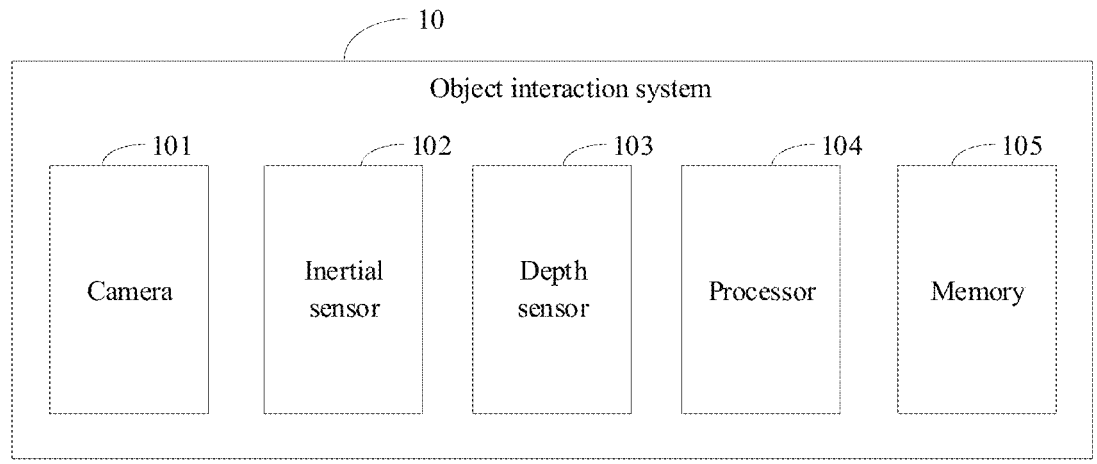
FIG. 1 schematically shows a block diagram of an object interaction system according to an exemplary embodiment of the disclosure.

Exemplary embodiments will be described in detail with reference to the accompanying drawings. However, the exemplary embodiments can be implemented in various forms, and should not be construed as being limited to the examples set forth herein. On the contrary, the provision of these embodiments makes the disclosure more comprehensive and complete, and fully conveys the concept of the exemplary embodiments to those of ordinary skill in the art. The described features, structures, or characteristics can be combined in one or more embodiments in any suitable manner. In the following description, many specific details are provided to give a sufficient explanation of the embodiments of the disclosure. However, those of ordinary skill in the art will realize that the technical solutions of the disclosure can be practiced by omitting one or more of the specific details, or adopting other methods, components, devices, steps, etc. In other cases, the well-known technical solutions are not shown or described in detail to avoid confusing aspects of the disclosure.

In addition, the drawings are only schematic illustrations of the disclosure, and are not necessarily drawn to scale. The same reference numerals in the figures denote the same or similar parts, so their repeated description will be omitted. Some of the block diagrams shown in the drawings are functional entities and do not necessarily correspond to physically or logically independent entities. These functional entities may be implemented in the form of software, or implemented in one or more hardware modules or integrated circuits, or implemented in different networks and/or processor devices and/or microcontroller devices.

The flowcharts shown in the drawings are only exemplary illustrations, and do not necessarily include all steps. For example, some steps can be decomposed, while some steps can be combined or partially combined, so the actual execution order may be changed according to the actual situation.

In some related technologies, gesture recognition and interaction based on RGB (red, green, and blue) images are limited to two-dimensional screen. For three-dimensional reality space, the two-dimensional interaction is inconvenient in actual operations and does not conform to the real interaction habits of users in daily activities.

In addition, in the augmented reality interactive scene, often only the positions of both parties of the interaction are considered, while the relative attitude between them is ignored, which may lead to scenes that do not conform to the common sense of interaction during interactive operations, resulting in poor user interaction experience, for example, when the back of the hand touches the virtual ball, the virtual ball will also be picked up.

In view of this, a new method of object interaction is needed.

FIG. 1 schematically shows a block diagram of an object interaction system according to an exemplary embodiment of the disclosure.

It should be noted that the object interaction system of the exemplary embodiment of the disclosure may be configured in a terminal device. The terminal device may be, for example, a mobile phone, a tablet, a head-mounted display device, etc., and the type of terminal device is not limited in the disclosure.

As shown in FIG. 1, the object interaction system 10 may include a camera 101, an inertial sensor 102, a depth sensor 103, a processor 104, and a memory 105.

The camera 101 is configured to acquire image information in a reality scene, in the embodiment of the disclosure, the images captured by the camera 101 are RGB images. The inertial sensor 102 is also referred to as an inertial measurement unit (IMU), which is configured to acquire the inertial information of the terminal device. The depth sensor 103 is configured to determine the depth information of each object in the reality scene. The processor 104 may be a processor, or a processor cluster including multiple processors. The memory 105 is configured to store one or more programs.

Specifically, the one or more programs, when executed by the processor 104, cause the processor 104 to perform: determining, based on the pixel information collected by the camera 101 in the reality scene and the inertial information of the terminal device collected by the inertial sensor 102, the pose of the terminal device in the real environment coordinate system; determining, based on the pixel information collected by the camera 101 and the depth information collected by the depth sensor 103, the pose of the first object relative to the terminal device; determining, based on the pose of the terminal device in the real environment coordinate system and the pose of the first object relative to the terminal device, the pose of the first object in the real environment coordinate system; determining the pose of the second object in the real environment coordinate system; and controlling the first object and the second object to interact with each other, according to the pose of the first object in the real environment coordinate system and the pose of the second object in the real environment coordinate system.

In addition, in the above description, the first object is an object that actually exists in the real environment, which may be a physical object, the second object is a virtual object configured in the real environment using computer technology, and the virtual object does not really exist in the real world.

Figure 2:
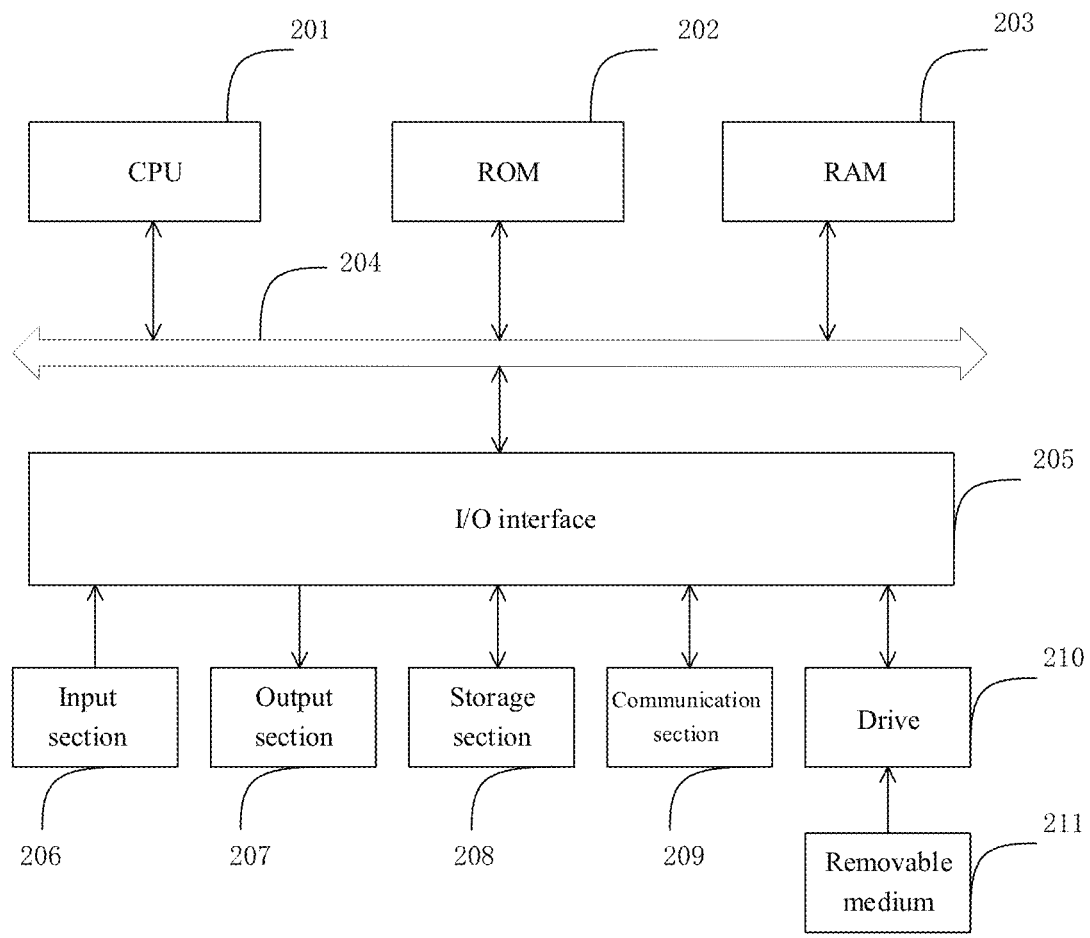
FIG. 2 shows a schematic structural diagram of a computer system suitable for implementing an electronic device according to an embodiment of the disclosure.

FIG. 2 shows a schematic structural diagram of a computer system suitable for implementing an electronic device according to an embodiment of the disclosure.

It should be noted that the computer system 200 of the electronic device shown in FIG. 2 is only an example, and should not bring any limitation to the function and application scope of the embodiments of the disclosure.

As shown in FIG. 2, the computer system 200 includes a central processing unit (CPU) 201, which can perform various appropriate actions and processing according to a program stored in a read-only memory (ROM) 202 or a program loaded from a storage section 208 to a random-access memory (RAM) 203. Various programs and data required for system operation are also stored in the RAM 203. The CPU 201, the ROM 202, and the RAM 203 are connected to each other through a bus 204. An input/output (I/O) interface 205 is also connected to the bus 204.

The following components are connected to the I/O interface 205: an input section 206 including a keyboard, a mouse, etc.; an output section 207 including a cathode ray tube (CRT), a liquid crystal display (LCD), a speaker etc.; a storage section 208 including a hard disk, etc.; and a communication section 209 including a network interface card such as a LAN card, a modem, and the like. The communication section 209 performs communication processing via a network such as the Internet. A drive 210 is also connected to the I/O interface 205 as needed. A removable medium 211, such as a magnetic disk, an optical disk, a magneto-optical disk, a semiconductor memory, etc., is installed on the drive 210 as needed, so that the computer program read therefrom is installed to the storage section 208 as needed.

Specifically, according to an embodiment of the disclosure, the process described below with reference to the flowchart may be implemented as a computer software program. For example, an embodiment of the disclosure provides a computer program product, which includes a computer program carried on a computer-readable medium, and the computer program contains executable program codes configured to implement the method shown in the flowchart. In the embodiment, the computer program may be downloaded and installed from the network through the communication section 209, and/or installed from the removable medium 211. When the computer program is executed by the central processing unit (CPU) 201, various functions defined in the system of the disclosure are implemented.

It should be noted that the computer-readable medium shown in the disclosure may be a computer-readable signal medium, or a computer-readable storage medium, or any combination of the two. The computer-readable storage medium may be, but is not limited to, an electrical, magnetic, optical, electromagnetic, infrared or semiconducting system/apparatus/device, or any combination thereof. More specifically, the implementation of the computer-readable storage medium may include, but is not limited to, an electrical connection with one or more wires, a portable computer disk, a hard disk, a random-access memory (RAM), a read-only memory (ROM), a erasable programmable a read-only memory (EPROM, or flash memory), an optical fiber, a portable compact disk read-only memory (CD-ROM), an optical storage device, a magnetic storage device, or any suitable combination thereof. In the disclosure, the computer-readable storage medium may be any tangible medium that contains or stores a program, and the program may be used by, or in combination with, an instruction execution system, apparatus, or device. In the disclosure, a computer-readable signal medium may include a data signal propagated in a baseband or as a part of a signal carrier, and computer-readable program codes are carried thereon. This propagated data signal may be in many forms, including, but not limited to, an electromagnetic signal, an optical signal, or any suitable combination thereof. The computer-readable signal medium may also be any computer-readable medium other than a computer-readable storage medium. The computer-readable medium may send, propagate, or transmit the program for use by the instruction execution system, apparatus, device, or the combination thereof. The program codes contained on the computer-readable medium can be transmitted by any suitable medium, including, but not limited to, wireless, wire, optical cable, RF, or any suitable combination thereof.

The flowcharts and block diagrams in the drawings illustrate the possible implemented architecture, functions, and operations of the system, method, and computer program product according to various embodiments of the disclosure. In this regard, each block in the flowcharts or block diagrams may represent a module, program segment, or part of the codes, which contains one or more executable instructions for implementing specified logic functions. It should also be noted that, in some alternative implementations, the functions marked in the blocks may also be implemented in an order different from the order shown in the drawings. For example, two blocks represented successively can actually be executed substantially in parallel, and they can sometimes be executed in a reverse order, depending on the functions involved. It should also be noted that each block in the block diagrams or flowcharts, and the combination of blocks in the block diagram or flowchart, can be implemented by a dedicated hardware-based system that performs specified functions or operations, or by a combination of dedicated hardware and computer instructions.

The units described in the embodiments of the disclosure may be implemented in software or hardware, and the described units may also be disposed in a processor. The names of these units do not constitute a limitation to the units themselves in certain circumstances.

In another aspect, the disclosure further provides a computer-readable medium. The computer-readable medium may be included in the electronic device described in the above embodiment, or exist alone without being assembled into the electronic device. The computer-readable medium carries one or more programs. The one or more programs, when executed by an electronic device, cause the electronic device to implement the methods described in the following embodiments.

The object interaction method of an exemplary embodiment of the disclosure will be described below with reference to FIG. 3. It should be noted that each step of the object interaction method can be executed by a terminal device. In this case, the object interaction apparatus described below can be configured in the terminal device.

Figure 3:
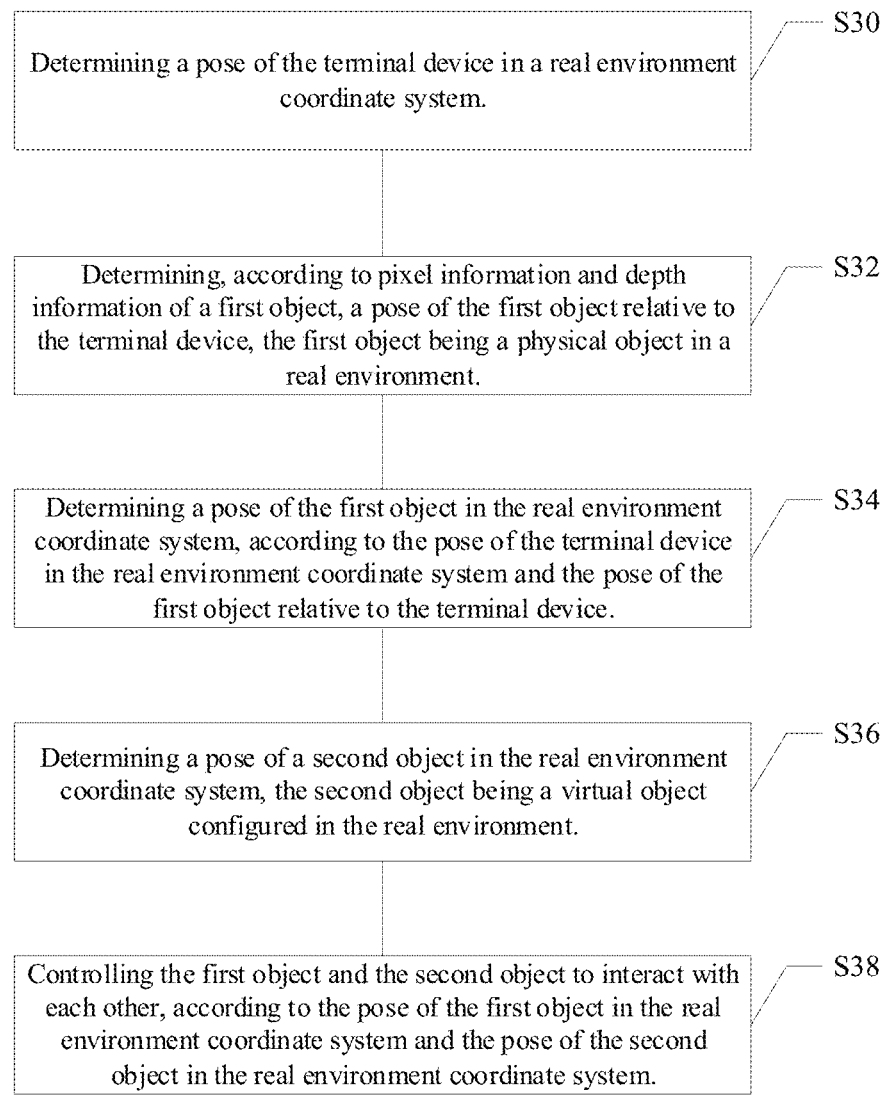
FIG. 3 schematically shows a flowchart of an object interaction method according to an exemplary embodiment of the disclosure.

Referring to FIG. 3, the object interaction method may include the following steps:

S30, determining a pose of the terminal device in a real environment coordinate system.

In the exemplary embodiments of the disclosure, on the one hand, a camera may be used to photograph a reality scene to determine the pixel information of the image in the reality scene. In an embodiment of the disclosure, a monocular camera may be used to shoot a reality scene to determine the pixel information of each physical object in the reality scene. The monocular camera is a camera constructed according to the principle of Pinhole imaging. It is a single color (or grayscale) camera, which has the advantages of simple use, high accuracy, and convenient configuration. For example, the terminal device is a mobile phone, the rear camera of the mobile phone can be used as a monocular camera to shoot the reality scene.

On the other hand, an inertial sensor can be used to monitor the inertial information of the terminal device in real time, where the inertial information mainly includes the amount of translation and the amount of rotation.

Specifically, the inertial sensor may include three accelerometers and three gyroscopes. The three accelerometers are configured to detect the acceleration information of the terminal device on each coordinate axis of the three-dimensional coordinate system, and then the amount of translation can be calculated. The three gyroscopes are configured to detect the amount of rotation of the terminal device in the three-dimensional coordinate system. In addition, for the convenience of calculation, the amount of rotation can be expressed as a rotation matrix.

It should be understood that the pixel information of the captured image can be used as the observation constraint, and the inertial information detected by the inertial sensor can be used as the action constraint. In this case, determining a pose of the terminal device in a real environment coordinate system can be described as: determining the pose of the terminal device under the joint constraint of observation constraint and action constraint. The pose described in the disclosure includes position information and attitude information.

Figure 4:
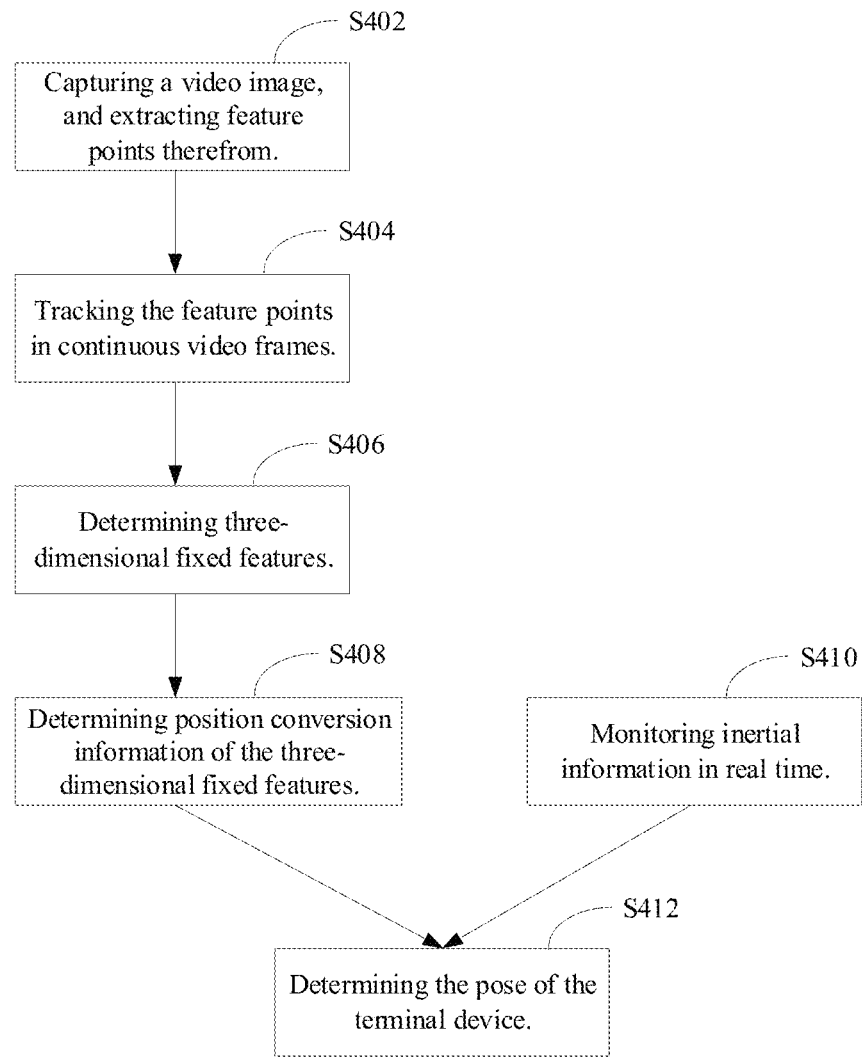
FIG. 4 schematically shows a flowchart of a method for determining the pose of a terminal device in a real environment coordinate system according to an exemplary embodiment of the disclosure.

The process of determining a pose of the terminal device in a real environment coordinate system according to the embodiment of the disclosure will be described below with reference to FIG. 4.

In step S402, capturing a video image by the camera, and extracting feature points from the video image. In some implementations, the feature points may be points representing the contour of the objects. Specifically, the captured image can be input into a feature point extraction model to determine the feature points in the image, and the feature point extraction model may be a trained convolutional neural network. For the convolutional neural network, it is easy to understand that the types of labeled sample images can be enriched to broaden the application of the convolutional neural network, enhance the robustness of the processing process, and improve the accuracy of identifying feature points.

The determined feature points may be combined with the inertial information detected by the inertial sensor to establish an initial coordinate system, an initial local map, and the initial pose of the terminal device.

In step S404, tracking the feature points in continuous video frames.

According to some embodiments of the disclosure, the feature point tracking may adopt an algorithm based on the principle of visual odometry, such as optical flow tracking method, direct method, and the like, which is not specially limited herein.

In an embodiment, KLT tracking method (Kanade-Lucas-Tomasi Tracking Method) may be adopted for feature point tracking. In another embodiment, ORB feature descriptor extracted based on ORB (Oriented FAST and Rotated BRIEF, fast feature point extraction and description) algorithm may be used for feature point tracking.

Further, for example, an affine transformation can be performed on the neighborhood of the feature point to obtain the projection area of the neighborhood in the current frame, and the amount of color shift between the neighborhood in the previous frame and the projection area in the current frame can be calculated as the tracking deviation of the feature point. For the determined multiple feature points, a plurality of feature points with smaller tracking deviation may be selected to implement the tracking process of the feature points.

In step S406, determining three-dimensional fixed features.

In exemplary embodiments of the disclosure, the three-dimensional fixed features in the reality scene can be determined based on the tracking of the feature points. These three-dimensional fixed features may be corner points and feature points with significant observation features in the reality scene, such as Sift (Scale-invariant feature transform) feature points, Harris corner points, ORB feature points, etc.

It should be understood that if the positions of some feature points do not change during the continuous tracking process of the feature points, these feature points can be considered to be the three-dimensional fixed features described in the disclosure.

After determining three-dimensional fixed features, a map of the reality scene can be constructed using a feature point cloud formed by the three-dimensional fixed features.

In step S408, determining position conversion information of the three-dimensional fixed features.

In the process of moving the camera for shooting, the terminal device can determine the position conversion information of the three-dimensional fixed features relative to the camera.

While performing the above analysis on the video image captured by the camera, in step S410, monitoring inertial information of the terminal device through an inertial sensor in real time.

In step S412, determining the pose of the terminal device in the real environment coordinate system, according to the position conversion information of the three-dimensional fixed features in the video frames and the inertial information of the terminal device.

In summary, it can be seen that the process of determining the pose of the terminal device in the disclosure may include: first, constructing an initial three-dimensional feature point cloud and determining an initial pose of the terminal device, using limited RGB images and inertial information; next, applying continuous observation constraints on the map and the pose of the terminal device according to continuously collected video frames, and applying continuous motion constraints on the map and the pose of the terminal device according to continuously collected inertial information; then, determining the pose of the terminal device under the joint action of the observation constraints and the motion constraints.

S32, determining, according to pixel information and depth information of a first object, a pose of the first object relative to the terminal device, the first object being a physical object in a real environment.

In exemplary embodiments of the disclosure, the first object is a physical object that actually exists in reality space. Although the first object is described below taking a human hand as an example, the first object may also be other parts of the human body. In addition, the first object may also be other objects in reality, such as a stick, a racket, and the like.

A depth sensor can be used to determine the depth information of the first object relative to the terminal device. For example, a TOF (Time of Flight) sensor can be used to determine depth information. Specifically, the TOF sensor can emit near-infrared light which reflects after encountering the first object. The TOF sensor calculates the distance to the first object by calculating the time difference or phase difference between the emission and the reflection of the light to determine the depth information.

It should be understood that the depth information corresponds to the pixel information collected in the reality scene. In other words, the determination of depth information and the acquisition of image pixel information often occur at the same time. For each image frame, there is corresponding depth information.

Then, the depth information can be combined with the image pixel information collected by the camera in step S30 to determine the pose of the first object relative to the terminal device.

In the process, it is needed to identify the first object. Specifically, the image can be input to an object recognition model. Similarly, the object recognition model can be a trained machine learning model. The model can extract the features of the first object to determine the category of the first object. Taking a human hand as an example, the model can perform semantic segmentation on the human hand and extract the key points of the human hand. When it is predicted that the probability of the first object being a human hand is greater than a preset threshold, it can be determined that the first object is the human hand.

By combining pixel information and depth information, the robustness of determining a pose of the first object relative to the terminal device is improved.

In addition, in some embodiments of the disclosure, in an AR interaction scene, some areas of the first object are not suitable for interactive action, otherwise it will not conform to the common sense of interaction in daily life. In this case, the processing procedure of step S32 may further include:

First, determining an interactive area of the first object. The interactive area may represent the area where interactive actions are actually performed. For example, when a hand grasps a virtual ball, or a hand carries a bag, the first object is the hand, and the interactive area may be a palm plane.

In the aspect of determining a palm plane, including: determining key points of the hand, specifically, the key points of the hand being points corresponding to the finger roots of the five fingers; and determining a palm plane based on the key points of the hand and taking the palm plane as the interactive area of the first object.

Then, determining depth information corresponding to the pixel information collected in the reality scene, and determining position information and attitude information of the interactive area relative to the terminal device, according to the depth information and the pixel information. In this case, the pose of the first object relative to the terminal device is represented by the position information and the attitude information of the interactive area relative to the terminal device.

Still taking the palm plane being an interactive area as an example, position information of a center point of the palm plane may be used as position information of the palm plane relative to the terminal device. In addition, orientation information of a normal of the palm plane may be used as attitude information of the palm plane relative to the terminal device. The orientation of the normal is perpendicular to the palm plane.

S34, determining a pose of the first object in the real environment coordinate system, according to the pose of the terminal device in the real environment coordinate system and the pose of the first object relative to the terminal device.

The pose is expressed in the form of coordinates, which can be expressed as (R, T), where R represents attitude information and T represents position information.

In this case, the pose of the terminal device in the real environment coordinate system can be expressed as (R1, T1), and the pose of the first object relative to the terminal device can be expressed as (R2, T2), then the pose of the first object in the real environment coordinate system is (R2*R1, T2+R2*T1).

S36. determining a pose of a second object in the real environment coordinate system, the second object being a virtual object configured in the real environment.

It should be understood that the second object does not exist in the real environment. When placing the virtual second object in the real environment using computer technology, the pose of the second object should be specified, the coordinate corresponding to the pose can be (R0, T0), in addition, this coordinate can also be referred to as anchor point coordinate.

S38. controlling the first object and the second object to interact with each other, according to the pose of the first object in the real environment coordinate system and the pose of the second object in the real environment coordinate system.

In the exemplary embodiments of the disclosure, the position relationship and the attitude relationship between the first object and the second object may be comprehensively considered to control their interaction.

First, determining a distance between the first object and the second object according to position information of the first object and position information of the second object in the real environment coordinate system.

Then, determining whether the distance between the first object and the second object being less than a preset distance threshold. The preset distance threshold can be set by the developer according to the complexity of the AR interaction scene, for example, the preset distance threshold can be set to be 2 cm.

If the distance between the first object and the second object is less than the preset distance threshold, determining whether an attitude of the first object matching an attitude of the second object. The matching relationship can be preconfigured according to the interaction scene, taking a hand grasping a virtual ball as an example, the matching relationship is that the orientation of the normal of the palm plane points to the center of the ball.

If it is determined that the attitude of the first object matches the attitude of the second object, triggering an interaction action between the first object and the second object. The interactive action can be set by the developer in advance, which includes, but is not limited to, changing the color of the second object, changing the shape of the second object, and executing preset actions.

However, the order of verifying the position relationship and verifying the attitude relationship is not specially limited in the disclosure. That is, it is possible to verify whether the attitudes match, and then judge whether the distance between the first object and the second object meets the distance requirement after the verification is successful.

It should be understood that the above distance requirement is not limited to performing an interactive action when the distance is relatively short. When the distance between the first object and the second object increases, the interactive action may also be triggered.

Figure 5:
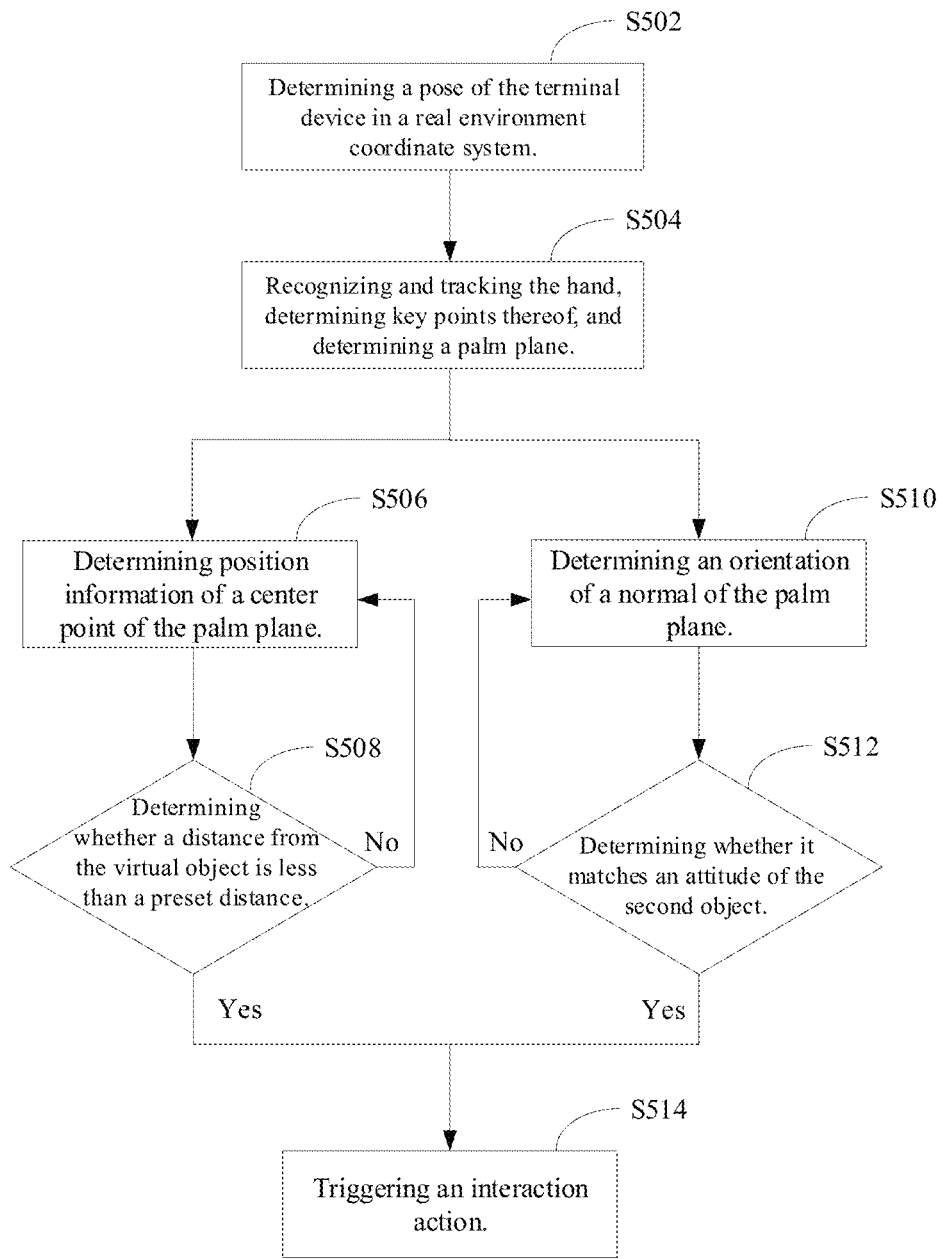
FIG. 5 schematically shows a flowchart illustrating the object interaction method of the disclosure taking a human hand being the first object as an example.

The object interaction process of the embodiment of the disclosure will be described below with reference to FIG. 5, taking a hand being the first object as an example.

In step S502, determining a pose of the terminal device in a real environment coordinate system. In step S504, recognizing and tracking the hand in a captured video image, determining key points of the hand, and determining a palm plane according to the key points of the hand. On the one hand, in step S506, determining position information of a center point of the palm plane; in step S508, determining whether a distance between the center point of the palm plane and a second object (virtual object) is less than a preset distance, according to the position information of the center point of the palm plane. If the distance is less than the preset distance, perform step S514, and if the distance is not less than the preset distance, skip to step S506.

On the other hand, in step S510, determining an orientation of a normal of the palm plane; in step S512, determining whether the orientation of the normal of the palm plane matches an attitude of the second object, if so, perform step S514, and if not, skip to step S510.

In step S514, in the AR scene, triggering an interaction action between the palm and the second object, such as hand grasping a virtual ball, hand carrying a virtual basket, hand holding a virtual door handle, etc.

The object interaction method of the disclosure will be described below taking the first object being a real human hand and the second object being a virtual ball as an example.

Figure 6:
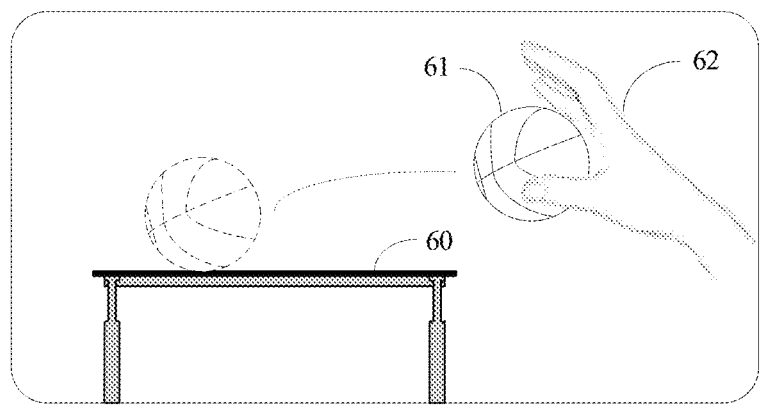
FIG. 6 shows a schematic diagram of a user interface for illustrating the object interaction method of the disclosure taking a real hand grasping a virtual ball as an example.

Referring to FIG. 6, a virtual ball 61 can be placed on a desktop 60 in a reality scene through computer technology. At this time, the user can view the virtual ball on the real desktop through the screen of the terminal device.

In this case, the user can grab the virtual ball 61 from the desktop 60 with a real human hand 62. The specific process may include: first, the terminal device acquiring the pixel information of the human hand 62 using the camera and acquiring the depth information of the human hand 62 using the depth sensor, so as to determine the pose of the human hand 62 relative to the terminal device; then, the terminal device determining the pose of the human hand 62 in the real environment coordinate system, according to the pose of the terminal device in the real coordinate system and the pose of the human hand 62 relative to the terminal device.

In the process of determining the pose of the human hand 62 in the real environment coordinate system in real time, the terminal device determines the distance between the human hand 62 and the virtual ball 61 and the relative relationship between the orientation of the normal of the palm plane of the human hand 62 and the virtual ball 61 in real time. Specifically, the orientation of the normal of the palm plane is a direction perpendicular to the palm plane and outward from the palm.

For example, the predetermined interaction rule is that: when the distance between the human hand and the virtual ball is less than 3 cm and the orientation of the normal of the palm plane points to the center of the ball, the human hand grabs the virtual ball. In a scene where this rule is applied, if the current relative relationship between the human hand 62 and the virtual ball 61 meets the predetermined interaction rule, the human hand 62 grabs the virtual ball 61. After the human hand 62 grabs the virtual ball 61 from the desktop 60, the human hand 62 can keep the attitude and move to change the position or movement mode of the virtual ball. FIG. 6 illustrates a schematic diagram of the human hand 62 grabbing and moving the virtual ball 61 for a certain distance.

According to an embodiment of the disclosure, on the premise that the pose of the human hand is determined, the terminal device may recognize the gesture, and determine the corresponding interactive action according to the result of the gesture recognition.

For example, when the second object is a virtual character (such as a virtual cartoon character), if the distance between the human hand and the virtual character is greater than 0.5 m and less than 2 m, and the orientation of the normal of the palm plane points to the virtual character, when it is recognized that the gesture is waving hand left and right, the virtual character is triggered to execute a greeting instruction. In this case, the virtual character may also wave its arm, thereby achieving an interactive action of greeting each other.

It should be noted that although the steps of the method in the disclosure are described in a specific order in the drawings, it does not require or imply that these steps must be performed in the specific order, or that all the steps shown must be performed to achieve the desired result. Additionally or alternatively, some steps may be omitted, multiple steps may be combined into one step for execution, and/or one step may be decomposed into multiple steps for execution.

Further, the exemplary embodiment further provides an object interaction apparatus, which is applied to a mobile device.

Figure 7:
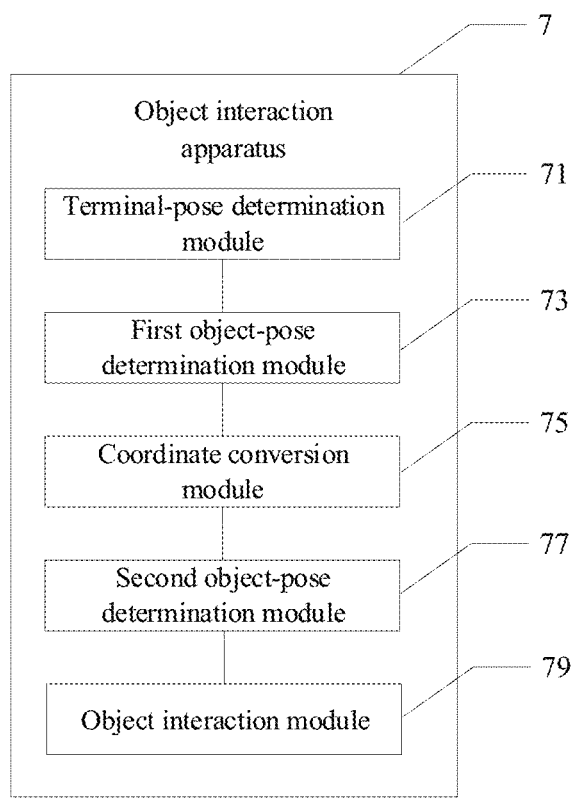
FIG. 7 schematically shows a block diagram of an object interaction apparatus according to an exemplary embodiment of the disclosure.

FIG. 7 schematically shows a block diagram of an object interaction apparatus according to an exemplary embodiment of the disclosure. Referring to FIG. 7, according to an exemplary embodiment of the disclosure, the object interaction apparatus 7 may include a terminal-pose determination module 71, a first object-pose determination module 73, a coordinate conversion module 75, a second object-pose determination module 77, and an object interaction module 79.

Specifically, the terminal-pose determination module 71 may be configured to determine the pose of the terminal device in the real environment coordinate system; the first object-pose determination module 73 may be configured to determine the pose of the first object relative to the terminal device according to the pixel information and depth information of the first object, where the first object is a physical object in the real environment; the coordinate conversion module 75 may be configured to determine the pose of the first object in the real environment coordinate system according to the pose of the terminal device in the real environment coordinate system and the pose of the first object relative to the terminal device; the second object-pose determination module 77 may be configured to determine the pose of the second object in the real environment coordinate system, where the second object is a virtual object configured in the real environment; the object interaction module 79 may be configured to control the first object and the second object to interact with each other according to the pose of the first object in the real environment coordinate system and the pose of the second object in the real environment coordinate system.

For the object interaction apparatus according to the exemplary embodiment of the disclosure, in an aspect, depth information is considered when determining the pose of the first object relative to the terminal device, in this way, it is more convenient to extend the object interaction to three-dimensional space scale, thereby improving the robustness of the object interaction process; in another aspect, by aligning the first object and the second object to the same coordinate system, it is convenient for analysis and conforms to the real physical interaction experience; in further another aspect, the pose, including position and attitude, is considered in the object interaction method of the disclosure, compared with some related technologies, the introduction of attitude avoids possible scenes that do not conform to the common sense of interaction, and makes the effect of interaction between the first object and the second object more real, thereby improving the interactive experience of the user when realizing an virtual-real interaction using augmented reality technology.

Figure 8:
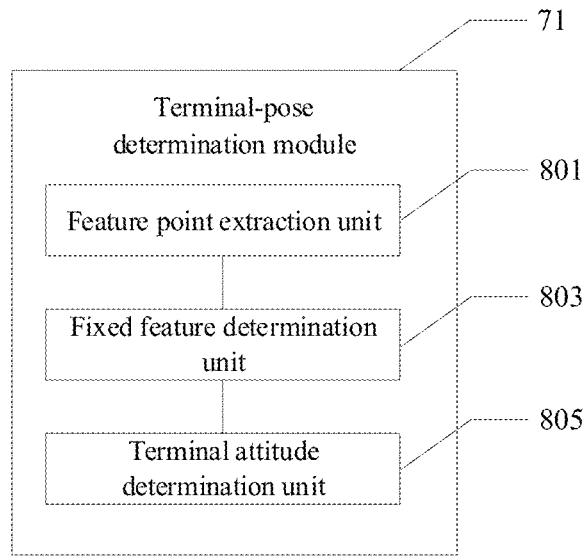
FIG. 8 schematically shows a block diagram of a terminal-pose determination module according to an exemplary embodiment of the disclosure.

Referring to FIG. 8, according to an exemplary embodiment of the disclosure, the terminal-pose determination module 71 may include a feature point extraction unit 801, a fixed feature determination unit 803 and a terminal attitude determination unit 805.

Specifically, the feature point extraction unit 801 may be configured to extract feature points from the video image captured in a reality scene; the fixed feature determination unit 803 may be configured to track the feature points in continuous video frames to determine three-dimensional fixed features in the reality scene; the terminal attitude determination unit 805 may be configured to determine the pose of the terminal device in the real environment coordinate system according to the position conversion information of the three-dimensional fixed features in the video frames and the inertial information of the terminal device.

Figure 9:
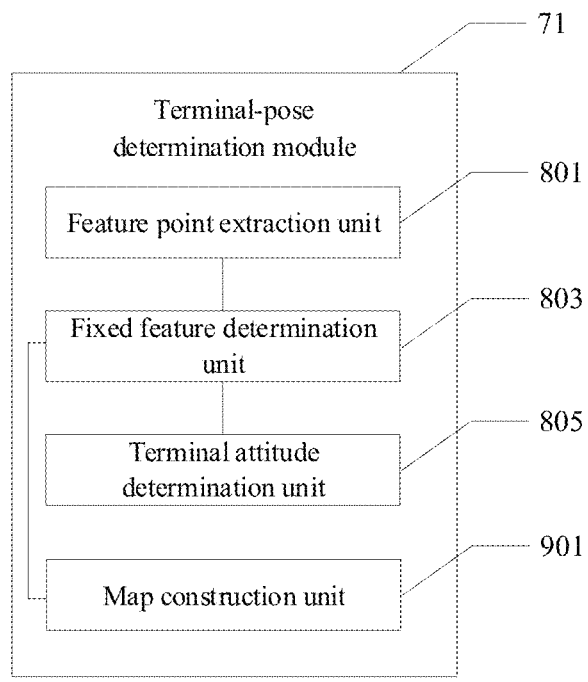
FIG. 9 schematically shows a block diagram of a terminal-pose determination module according to another exemplary embodiment of the disclosure.

Referring to FIG. 9, according to an exemplary embodiment of the disclosure, the terminal-pose determination module 71 may further include a map construction unit 901.

Specifically, the map construction unit 901 may be configured to construct a map of the reality scene by using the feature point cloud formed by the three-dimensional fixed features after determining the three-dimensional fixed features in the reality scene.

According to an exemplary embodiment of the disclosure, the first object-pose determination module 73 may be configured to perform: determining an interactive area of the first object; determining pixel information and depth information of the interactive area; and determining position information and attitude information of the interactive area relative to the terminal device, according to the pixel information and the depth information of the interactive area, wherein the pose of the first object relative to the terminal device is represented by the position information and the attitude information of the interactive area relative to the terminal device.

According to an exemplary embodiment of the disclosure, the first object is a hand. In this case, the process of the first object-pose determination module 73 determining an interactive area of the first object may include: determining key points of the hand; and determining a palm plane based on the key points of the hand and taking the palm plane as the interactive area of the first object.

According to an exemplary embodiment of the disclosure, the first object-pose determination module 73 may be configured to perform: determining position information of a center point of the palm plane according to pixel information and depth information of the palm plane, and taking the position information of the center point of the palm plane as position information of the palm plane relative to the terminal device; and determining orientation information of a normal of the palm plane according to the pixel information and the depth information of the palm plane, and taking the orientation information of the normal of the palm plane as attitude information of the palm plane relative to the terminal device.

According to an exemplary embodiment of the disclosure, the object interaction module 79 may be configured to perform: determining a distance between the first object and the second object, according to position information of the first object and position information of the second object in the real environment coordinate system; and triggering an interaction action between the first object and the second object, in response to the distance between the first object and the second object being less than a preset distance threshold and an attitude of the first object matching an attitude of the second object.

The details of performance analysis of the functional modules of the apparatus are the same as described in the above method embodiments, which will not be repeated here.

Through the description of the above embodiments, those of ordinary skill in the art can easily understand that the exemplary embodiments described herein can be implemented by software or combining software with necessary hardware. Therefore, the technical solution according to the embodiments of the disclosure can be embodied in the form of a software product, which can be stored in a non-volatile storage medium (such as CD-ROM, U disk, mobile hard disk, etc.) or on the network, and includes several instructions configured to cause a computing device (such as personal computer, server, terminal device, network device, etc.) to perform the method according to the embodiments of the disclosure.

In addition, the above drawings are merely schematic descriptions of the processes included in the method according to the exemplary embodiments of the disclosure, and are not intended to limit the disclosure. It is easy to understand that the processes shown in the above drawings do not indicate or limit the time sequence of these processes. In addition, it is easy to understand that these processes can be performed synchronously or asynchronously, for example, in multiple modules.

It should be noted that although several modules or units of the device for performing actions are mentioned in the above detailed description, this division is not mandatory. In fact, according to the embodiments of the disclosure, the features and functions of two or more modules or units described above may be implemented in one module or unit, conversely, the features and functions of a module or unit described above may be further divided to be implemented by multiple modules or units.

Those of ordinary skill in the art will easily think of other embodiments of the disclosure after considering the specification and practicing the invention disclosed herein. This application is intended to cover any variations, uses, and adaptive changes of the disclosure. These variations, uses, and adaptive changes follow the general principle of the disclosure and include common knowledge or conventional technical means in the technical field not disclosed herein. The specification and the embodiments are only exemplary, and the scope and spirit of the disclosure are defined by the claims.

It should be understood that, the disclosure is not limited to the precise structure that has been described above and shown in the drawings, and various modifications and variations can be made without departing from the scope of the disclosure. The scope of the disclosure is limited by the appended claims.

What is claimed is:

1. An object interaction method, applied to a terminal device, comprising:

determining a pose of the terminal device in a real environment coordinate system;

determining, according to pixel information and depth information of a first object, a pose of the first object relative to the terminal device, the first object being a hand in a real environment;

determining a pose of the first object in the real environment coordinate system, according to the pose of the terminal device in the real environment coordinate system and the pose of the first object relative to the terminal device;

determining a pose of a second object in the real environment coordinate system, the second object being a virtual character configured in the real environment; and controlling the first object and the second object to interact with each other, according to the pose of the first object in the real environment coordinate system and the pose of the second object in the real environment coordinate system, comprising:

determining a distance between the hand and the virtual character in the real environment, according to position information of the hand and position information of the virtual character in the real environment coordinate system;

determining an orientation of a normal of a palm plane of the hand in the real environment, according to attitude information of the hand in the real environment coordinate system;

performing gesture recognition to recognize a gesture of the hand; and triggering an interaction action of the virtual character with the hand, in response to determining that the distance between the hand and the virtual character in the real environment is greater than a first preset value and less than a second preset value, the orientation of the normal of the palm plane of the hand points to the virtual character, and the gesture is recognized as waving the hand; wherein the interaction action is that the virtual character is triggered to execute a greeting instruction.

2. The object interaction method as claimed in claim 1, wherein determining a pose of the terminal device in a real environment coordinate system comprises:
   extracting feature points from a video image captured in a reality scene;
   tracking the feature points in continuous video frames and determining three-dimensional fixed features in the reality scene; and
   determining the pose of the terminal device in the real environment coordinate system, according to position conversion information of the three-dimensional fixed features in the video frames and inertial information of the terminal device.

3. The object interaction method as claimed in claim 2, wherein after determining three-dimensional fixed features in the reality scene, the method further comprises:
   constructing a map of the reality scene using a feature point cloud formed by the three-dimensional fixed features.

4. The object interaction method as claimed in claim 2, wherein determining a pose of the terminal device in a real environment coordinate system comprises:
   constructing an initial three-dimensional feature point cloud to construct a map of the reality scene and determining an initial pose of the terminal device, using limited RGB images and inertial information;
   applying continuous observation constraints on the map and the pose of the terminal device according to continuously collected video frames, and applying continuous motion constraints on the map and the pose of the terminal device according to continuously collected inertial information; and
   determining the pose of the terminal device under a joint action of the observation constraints and the motion constraints.

5. The object interaction method as claimed in claim 2, wherein an algorithm based on a principle of visual odometry is adopted to perform feature point tracking.

6. The object interaction method as claimed in claim 5, further comprising:
   performing an affine transformation on a neighborhood of respective feature points to obtain a projection area of the neighborhood in a current frame,
   calculating an amount of color shift between a neighborhood in a previous frame and the projection area in the current frame as a tracking deviation of the respective feature points; and
   selecting a plurality of feature points with smaller tracking deviation to implement a tracking process of the feature points.

7. The object interaction method as claimed in claim 1, wherein determining, according to pixel information and depth information of a first object, a pose of the first object relative to the terminal device comprises:
   determining an interactive area of the first object;
   determining pixel information and depth information of the interactive area; and
   determining position information and attitude information of the interactive area relative to the terminal device, according to the pixel information and the depth information of the interactive area;
   wherein the pose of the first object relative to the terminal device is represented by the position information and the attitude information of the interactive area relative to the terminal device.

8. The object interaction method as claimed in claim 7, wherein the determining an interactive area of the first object comprises:
   determining key points of the hand; and
   determining the palm plane based on the key points of the hand and taking the palm plane as the interactive area of the first object.

9. The object interaction method as claimed in claim 8, wherein determining position information and attitude information of the interactive area relative to the terminal device, according to the pixel information and the depth information of the interactive area comprises:
   determining position information of a center point of the palm plane according to pixel information and depth information of the palm plane, and taking the position information of the center point of the palm plane as position information of the palm plane relative to the terminal device; and
   determining orientation information of the normal of the palm plane according to the pixel information and the depth information of the palm plane, and taking the orientation information of the normal of the palm plane as attitude information of the palm plane relative to the terminal device.

10. The object interaction method as claimed in claim 1, wherein the pose of the terminal device in the real environment coordinate system is expressed as (R1, T1), the pose of the first object relative to the terminal device is expressed as (R2, T2), and the pose of the first object in the real environment coordinate system is determined to be (R2*R1, T2+R2*T1), where R represents attitude information and T represents position information.

11. An object interaction system, comprising:
   a camera, configured to acquire image information in a reality scene;
   an inertial sensor, configured to acquire inertial information of a terminal device;
   a depth sensor, configured to determine depth information of an object in the reality scene;
   one or more processors; and
   a memory, configured to store one or more programs which, when executed by the one or more processors, cause the one or more processors to perform steps of:
   determining a pose of the terminal device in a real environment coordinate system;
   determining, according to pixel information and depth information of a first object, a pose of the first object relative to the terminal device, the first object being a hand in a real environment;
   determining a pose of the first object in the real environment coordinate system, according to the pose of the terminal device in the real environment coordinate system and the pose of the first object relative to the terminal device;
   determining a pose of a second object in the real environment coordinate system, the second object being a virtual character configured in the real environment;
   determining a position relationship between the first object and the second object and an attitude relationship between the first object and the second object, based on the pose of the first object in the real environment coordinate system and the pose of the second object in the real environment coordinate system; and controlling the first object and the second object to interact with each other, according to the position relationship and the attitude relationship;

wherein the determining a position relationship between the first object and the second object and an attitude relationship between the first object and the second object, based on the pose of the first object in the real environment coordinate system and the pose of the second object in the real environment coordinate system, comprises:

determining a distance between the hand and the virtual character in the real environment, according to position information of the hand and position information of the virtual character in the real environment coordinate system; and determining an orientation of a normal of a palm plane of the hand in the real environment, according to attitude information of the hand in the real environment coordinate system; and the controlling the first object and the second object to interact with each other, according to the position relationship and the attitude relationship, comprises:

performing gesture recognition to recognize a gesture of the hand; and triggering an interaction action of the virtual character with the hand, in response to determining that the distance between the hand and the virtual character in the real environment is greater than a first preset value and less than a second preset value, the orientation of the normal of the palm plane of the hand points to the virtual character, and the gesture is recognized as waving the hand; and wherein the interaction action is that the virtual character is triggered to execute a greeting instruction.

12. The object interaction system as claimed in claim 11, wherein the depth sensor is a Time of Flight sensor, the Time of Flight sensor is configured to emit near-infrared light which reflects after encountering the first object.

13. The object interaction system as claimed in claim 11, wherein the inertial sensor comprises three accelerometers and three gyroscopes, the three accelerometers are configured to detect acceleration information of the terminal device on each coordinate axis of a three-dimensional coordinate system to calculate the amount of translation, and the three gyroscopes are configured to detect the amount of rotation of the terminal device in the three-dimensional coordinate system.

14. The object interaction system as claimed in claim 11, wherein determining a pose of the terminal device in a real environment coordinate system comprises:

extracting feature points from a video image captured in a reality scene;

tracking the feature points in continuous video frames and determining three-dimensional fixed features in the reality scene;

determining the pose of the terminal device in the real environment coordinate system, according to position conversion information of the three-dimensional fixed features in the video frames and inertial information of the terminal device; and constructing a map of the reality scene using a feature point cloud formed by the three-dimensional fixed features.

15. The object interaction system as claimed in claim 14, wherein an algorithm based on a principle of visual odometry is adopted to perform feature point tracking, and the method further comprises:

performing an affine transformation on a neighborhood of respective feature points to obtain a projection area of the neighborhood in a current frame;

calculating an amount of color shift between a neighborhood in a previous frame and the projection area in the current frame as a tracking deviation of the respective feature points; and selecting a plurality of feature points with smaller tracking deviation to implement a tracking process of the feature points.

16. The object interaction system as claimed in claim 11, wherein the determining, according to pixel information and depth information of a first object, a pose of the first object relative to the terminal device comprises:

determining key points of the hand;

determining the palm plane based on the key points of the hand and taking the palm plane as an interactive area of the first object;

determining pixel information and depth information of the interactive area; and determining position information and attitude information of the interactive area relative to the terminal device, according to the pixel information and the depth information of the interactive area;

wherein the pose of the first object relative to the terminal device is represented by the position information and the attitude information of the interactive area relative to the terminal device.

17. The object interaction system as claimed in claim 11, wherein the pose of the terminal device in the real environment coordinate system is expressed as (R1, T1), the pose of the first object relative to the terminal device is expressed as (R2, T2), and the pose of the first object in the real environment coordinate system is determined to be (R2*R1, T2+R2*T1), where R represents attitude information and T represents position information.

18. A non-transitory computer-readable medium, with a computer program stored thereon, wherein the computer program, when executed by a processor, is configured to implement an object interaction method, the method comprising:

determining a pose of a terminal device in a real environment coordinate system;

determining, according to pixel information and depth information of a first object, a pose of the first object relative to the terminal device, the first object being a physical object in a real environment;

determining a pose of the first object in the real environment coordinate system, according to the pose of the terminal device in the real environment coordinate system and the pose of the first object relative to the terminal device;

determining a pose of a second object in the real environment coordinate system, the second object being a virtual object configured in the real environment;

determining a distance between the first object and the second object, according to the pose of the first object in the real environment coordinate system and the pose of the second object in the real environment coordinate system; and triggering an interaction action between the first object and the second object, in response to the distance between the first object and the second object being less than a preset distance threshold and an attitude of the first object matching an attitude of the second object;
wherein the determining a pose of the terminal device in a real environment coordinate system, comprises:
extracting feature points from a video image captured in a reality scene;
tracking the feature points in continuous video frames and determining three-dimensional fixed features in the reality scene; and
determining the pose of the terminal device in the real environment coordinate system, according to position conversion information of the three-dimensional fixed features in the video frames and inertial information of the terminal device;
wherein an algorithm based on a principle of visual odometry is adopted to perform feature point tracking, and the method further comprises:
performing an affine transformation on a neighborhood of respective feature points to obtain a projection area of the neighborhood in a current frame;
calculating an amount of color shift between a neighborhood in a previous frame and the projection area in the current frame as a tracking deviation of the respective feature points; and
selecting a plurality of feature points with smaller tracking deviation to implement a tracking process of the feature points.

19. The non-transitory computer-readable medium as claimed in claim 18, wherein the pose of the terminal device in the real environment coordinate system is expressed as (R1, T1), the pose of the first object relative to the terminal device is expressed as (R2, T2), and the pose of the first object in the real environment coordinate system is determined to be (R2*R1, T2+R2*T1), where R represents attitude information and T represents position information.

20. The non-transitory computer-readable medium as claimed in claim 18, wherein the first object is a hand, and the second object is a virtual character;
the determining a distance between the first object and the second object, according to the pose of the first object in the real environment coordinate system and the pose of the second object in the real environment coordinate system, comprises:
determining a distance between the hand and the virtual character in the real environment, according to position information of the hand and position information of the virtual character in the real environment coordinate system; and
the triggering an interaction action between the first object and the second object, in response to the distance between the first object and the second object being less than a preset distance threshold and an attitude of the first object matching an attitude of the second object, comprises:
determining an orientation of a normal of a palm plane of the hand in the real environment, according to attitude information of the hand in the real environment coordinate system;
performing gesture recognition to recognize a gesture of the hand; and
triggering an interaction action of the virtual character with the hand, in response to determining that the distance between the hand and the virtual character in the real environment is greater than a first preset value and less than a second preset value, the orientation of the normal of the palm plane of the hand points to the virtual character, and the gesture is recognized as waving the hand; and wherein the interaction action is that the virtual character is triggered to execute a greeting instruction.

\* \* \* \* \*